United States Patent [19]

Althauser et al.

[11] 4,129,853

[45] Dec. 12, 1978

[54] METHOD AND APPARATUS FOR PRODUCING COMPENSATED SIGNALS FOR INDIVIDUAL LIGHT SENSORS ARRANGED IN A PREDETERMINED RELATION

[75] Inventors: William E. Althauser, Longmont, Colo.; Richard A. Barnes, Lompoc, Calif.

[73] Assignee: International Business Machines Corporation, Armonk, N.Y.

[21] Appl. No.: 836,882

[22] Filed: Sep. 26, 1977

[51] Int. Cl.² .......................................... G06K 9/00
[52] U.S. Cl. ........................ 340/146.3 AG; 358/282
[58] Field of Search .......... 340/146.3 MA, 146.3 AG, 340/146.3 R; 358/282, 80

[56] References Cited

U.S. PATENT DOCUMENTS

| | | | |
|---|---|---|---|
| 3,800,078 | 3/1974 | Cochran et al. | 340/146.3 AG |
| 3,872,434 | 3/1975 | Duvall et al. | 340/146.3 AG |
| 3,962,681 | 6/1976 | Requa et al. | 340/146.3 AG |
| 4,058,828 | 11/1977 | Ladd | 358/80 |

Primary Examiner—Leo H. Boudreau
Attorney, Agent, or Firm—Frank C. Leach, Jr.

[57] ABSTRACT

The output signal from each light sensor of a solid state array is compensated for variations due to dark scan noise levels, which are due to fixed pattern noise and sensor leakage, produced by the individual light sensors and variations in the light conditions to which the light sensors are subjected. Each of the output signals also can have its threshold level reduced through removing a portion of the signal caused by an output produced by the light sensor when it is scanning a black document. The compensation signals for the noise level variations and the light condition variations are obtained for each of the light sensors separately. The changing in the threshold level due to the black level can be the same for each of a group of the light sensors.

22 Claims, 6 Drawing Figures

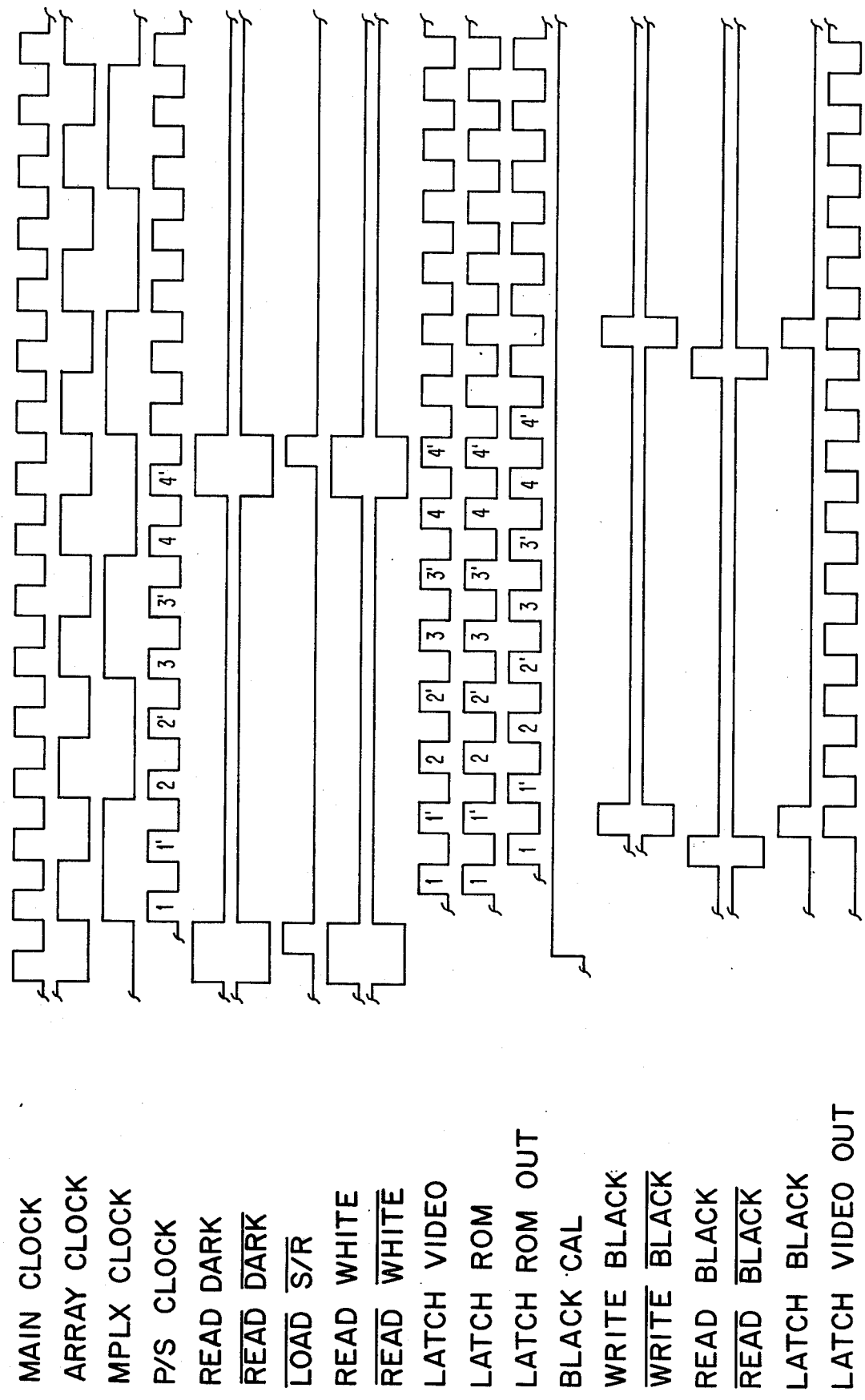

METHOD AND APPARATUS FOR PRODUCING COMPENSATED SIGNALS FOR INDIVIDUAL LIGHT SENSORS ARRANGED IN A PREDETERMINED RELATION

When scanning an illuminated area such as a document, for example, by light sensors, it is desired that the output signal from each of the light sensors be as uniform as possible with respect to the output signals from the other light sensors. Otherwise, the output signals of the light sensors will not necessarily give an indication of the relative illumination of various portions of the illuminated area.

The output signal from any light sensor is equal to the sum of the quotient of the document illumination divided by the non-uniform gain factor, the sensor leakage, the fixed pattern noise, and the random noise. With the non-uniform gain factor, the sensor leakage, the fixed pattern noise, and the random noise being different for each of the light sensors, substantial differences in signals from the light sensors can be obtained when the light sensors are subjected to the same level of light.

One cause of the non-uniform gain factor is that the power density at the plane of the illuminated area being scanned is not constant throughout. Instead, there is non-uniformity, particularly in the length, of the area of the document being illuminated. It is not unusual for this non-uniformity to be in the range of five to ten percent.

When scanning an illuminated area such as a document, for example, it is usually necessary to utilize an imaging system to direct the light from the illuminated area to the light sensors of the scanning arrays. This is because the width of the area being scanned is usually greater than the length of any commercially available package containing an array of light sensors in a predetermined relation so that a plurality of packages of the arrays must be employed.

As a result of the plurality of packages of the arrays of the light sensors having to be employed, the abutting of the packages against each other results in the light sensors not being aligned with the entire width of the area. Furthermore, because the length of the package containing the array of light sensors is usually greater than the length of the light sensor area with the length of the package being disposed along the width of the area being scanned, there are portions of each package within which there is no light sensor so that this constitutes another area in which a segment of the illuminated area is not aligned with a light sensor. Therefore, the light from the illuminated area must be optically merged by an imaging system so that each segment of the width of the illuminated area is directed to a different light sensor of one of the arrays.

Accordingly, to image a stripe across the full width of an illuminated area, it is necessary to utilize mirrors and a lens to image the light to the sensors. Furthermore, to obtain the optical merging because of the inability of all of the light sensors physically to abut each other, a beam splitter can be employed to project two complete and separate images on different arrays of light sensors. In this manner, the entire width of the stripe of the illuminated area is sensed by the arrays with each segment of the width being sensed by a different one of the light sensors of one of the arrays.

This imaging and optical merging are also causes of the non-uniform gain factor. The mirror reflection produces non-uniformities in the amount of light transmitted to each of the various light sensors.

When transmitting light through a lens, there is less light gathered at the higher half angles than at the axis of the lens. This roll-off of light at the image plane prevents the same level of light from being transmitted to each of the light sensors.

The beam splitter does not have the same transmission and reflection characteristics. Thus, the image receiving the reflected light from the beam splitter rather than the transmitted light has a different intensity. Accordingly, any array of light sensors receiving reflected light would produce a different signal than an array receiving transmitted light for the same light level.

Each of these various non-uniformities can cause a ten to twenty percent difference in the output of light sensors of different arrays for the same light level. However, for each of the light sensors, the non-uniform gain factor is the same irrespective of the level of light applied to the light sensor.

The sensor leakage, which is an additive component in the output signal of a light sensor, is most important when the light sensor is operating in an integration mode in which the incident light is integrated over a period of time. Since the sensor leakage signal is proportional to time, the leakage signal increases in magnitude as the integration period increases. However, for a fixed integration period, the sensor leakage, which is due to dark leakage current, is constant for a given environment. Thus, for a fixed integration period of time, the signal produced by the sensor leakage for a specific light sensor is constant.

The output signal of the light sensor also includes fixed pattern noise. This can be produced from a solid state sensing array by the clock switching transients. These are capacitively coupled into the output signal and are due to the close proximity of the clock lines to the output line on the integrated chip having the light sensors and the fast switching of the clock signals on the clock lines. For a specific operating frequency, the fixed pattern noise for each of the light sensors is a constant. Since the scanner is usually operated for the same integration period, the operating frequency remains the same.

While random noise varies so that it is not capable of being removed from the output signal of the light sensor, it is minimized when the light sensors are operated in a charge integration mode. This is because the random noise is averaged along with the signal. While this random noise affects the accuracy of the output signal of each of the light sensors, it is very small so that is does not have any significant effect on the output signal in comparing the levels of light received by each of the light sensors of the arrays of the scanner.

The present invention is capable of having the light sensors produce output signals accurately indicating the light level received by each of the light sensors. The invention accomplishes this by obtaining the signals produced by the sensor leakage and the fixed pattern noise through scanning a non-illuminated area to obtain the amplitude of the signal produced by the sensor leakage and the fixed pattern noise at each of the light sensors.

After the amplitude of this signal for the sensor leakage and the fixed pattern noise is obtained for each of the light sensors, it is stored for use as a compensation signal. Then, each of the light sensors is subjected to a substantially uniform white area to determine the highest signal level possible from each of the light sensors. The stored compensation signal for the sensor leakage and the fixed pattern noise for each of the light sensors is subtracted from the output signal obtained from the same light sensor when the light sensor is receiving light from a substantially uniform white area.

Thus, the amplitude of this signal is for only the sum of the quotient of the document illumination due to the white area divided by the non-uniform gain factor plus the random noise. Therefore, each of these signals would be substantially the same except for the non-uniform gain factor.

Normalization of the non-uniform gain factor for each of the light sensors is obtained through selecting a constant or normalized level, which preferably is at least equal to the maximum output from any of the light sensors. This normalized level is utilized to produce a look-up table of a read only memory having the columns indicate the level of the signals produced by any light sensor when scanning the substantially uniform white area and the rows of the look-up table indicate the outputs from any of the light sensors during actual scanning. The output from the read only memory has compensation for the non-uniform gain factor and normalization.

Instead of using a look-up table for the read only memory, the read only memory could be replaced by a multiplier, for example, in which the output signal, which is obtained during actual scanning, is multiplied by a gain factor, which is obtained when scanning the substantially uniform white area. The gain factor is obtained by comparing the output signal for each light sensor during scanning of the substantially uniform white area with the normalization level and obtaining a gain factor for each of the light sensors to compensate for this non-uniform gain factor. Thus, as the output signal from a light sensor is reduced because of the non-uniform gain factor, the gain factor is increased.

This correction or compensation gain factor can be stored for each of the light sensors. Then, this gain factor can be used during actual scanning to multiply the output signal from the same light sensor after the output signal from the same light sensor has had the stored compensation signal for dark leakage current and fixed pattern noise subtracted therefrom.

To reduce the threshold level from the light sensors so that a very small level of light received by a light sensor can be obtained, it is necessary to remove a black level signal from the output signal of each of the light sensors. This black level signal is obtained by the light sensors scanning a substantially uniform contrast black document in the presence of illumination.

This black level signal is obtained after the output signal from the light sensor has been compensated for dark leakage current, fixed pattern noise, and non-uniform gain factor. Thus, the signal is normalized when the black document is scanned. Therefore, it is not necessary that the black level output for all of the light sensors be obtained since they are substantially the same because of normalization of the output signals. However, if desired, the black level for each light sensor could be obtained and stored rather than utilizing an average black level output obtained from one or more of the light sensors for each of the arrays. Accuracy is slightly increased when obtaining the black level output for each of the light sensors separately, but this also increases the expense of the system because of the additional memory.

An object of this invention is to provide a method and apparatus for obtaining signals accurately representative of the light level received by each of separate light sensors arranged in a predetermined relation.

Another object of this invention is to provide a method and apparatus for obtaining substantially uniform signals from scan information produced by light sensors arranged in a predetermined relation.

A further object of this invention is to provide a method and apparatus for compensating for variations in output signals from light sensors arranged in a predetermined relation due to noise level variations and variations in light conditions.

The foregoing and other objects, features, and advantages of the invention will be apparent from the following more particular description of a preferred embodiment of the invention as illustrated in the accompanying drawings.

In the drawings:

FIG. 6 is a timing diagram showing the relationship of various clock pulses during a black scan cycle and a normal scan cycle.

Figure 1:
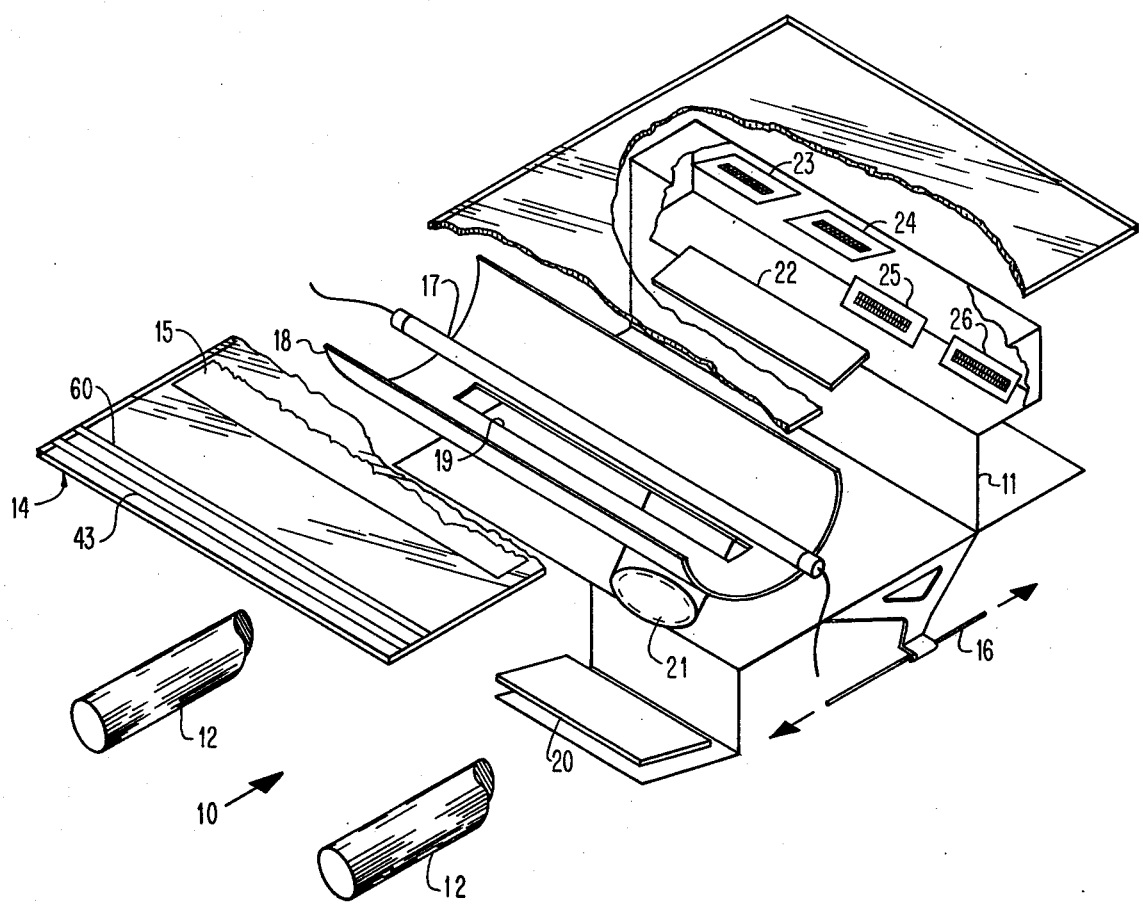
FIG. 1 is a schematic perspective view of scanner having the compensation apparatus of the present invention.

Referring to the drawings and particularly FIG. 1, there is shown a scanner 10. The scanner 10 includes a housing 11, which is mounted on guide rods 12 for sliding movement relative to a document glass 14 on which a document 15 is supported for scanning. The housing 11 has rail support blocks with bearings for riding on the guide rods 12.

A cable 16 is connected to the housing 11 and to a drive mechanism (not shown). Thus, movement of the cable 16 by the drive mechanism causes the housing 11 to move relative to the document glass 14 in the direction of the arrows.

The housing 11 has a light source 17 supported therein. The light source 17 has its light focused from a curved reflector 18 as a strip of light. This strip of reflected light is applied to the document 15 to illuminate an area, which is a stripe, across the width of the document 15.

The reflector 18 has a slot 19 in its bottom to allow rays of light from the illuminated area of the document 15 to be transmitted to a mirror 20. The rays of light are reflected from the mirror 20 to a lens 21, which has the light therefrom intercepted by a beam splitter 22.

The beam splitter 22 projects the complete and separate images. Portions of one of the complete images are supplied to arrays 23 and 24 of light sensors, and portions of the other complete and separate image are supplied to arrays 25 and 26 of light sensors.

The arrays 23–26 are positioned so that light of the entire image is received by the arrays 23–26. Thus, even though the arrays 23–26 of the light sensors cannot be physically abutted against each other, the arrangement in two different planes of the arrays 23–26 enables the entire illuminated area to have the light transmitted therefrom to the arrays 23–26.

Figure 2:
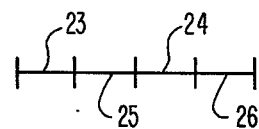
FIG. 2 is a schematic view showing the relationship of portions of the illuminated area scanned by the various arrays of the scanner.

As shown in FIG. 2, the array 25 receives light from a portion of the illuminated area between portions of the illuminated area supplied to the arrays 23 and 24. The array 26 receives light from the portion of the illuminated area to the side of the portion of the area having its light received by the array 24.

The arrays 23–26 of light sensors can be any type of light sensors having a predetermined relation to each other. One suitable example of each of the arrays 23–26 is a 1024-element linear image sensor charge coupled device sold by Fairchild Semiconductor Components Group, Fairchild Camera And Instrument Corporation, Mountain View, Calif. as model CCD131.

When the arrays 23–26 are Fairchild model CCD131 arrays, each of the arrays 23–26 has two output lines with each of the output lines having an output from a different light sensor thereon at a different time than the other output line. Accordingly, the two output lines from the array 23 are connected to an analog multiplexer 27 (see FIG. 3). Similarly, the two output lines of the array 25 are connected to an analog multiplexer 28. One suitable example of each of the analog multiplexers 27 and 28 is a twin dual complementary single pole single throw bi-mos analog switch sold as model TL191M by Texas Instruments.

The analog multiplexer 27 controls when each of the two output lines of the array 23 has its output supplied to an analog to digital converter (ADC) 30 in which the analog signal from each of the light sensors of the array 23 is converted into a digital signal for supply to data latches 31. Similarly, the analog multiplexer 28 controls when each of the two output lines from the array 25 is connected to an analog to digital converter (ADC) 32, which converts the analog output from each of the light sensors of the array 25 into a digital signal, for supply to the data latches 31.

The analog multiplexer 27 connects each of the two output lines of the array 23 to the ADC 30 in accordance with a MPLX CLOCK signal. Thus, each time that the MPLX CLOCK signal, which is supplied to the analog multiplexer 27, changes state, a different one of the two output lines from the array 23 is connected to the ADC 30. The analog multiplexer 28 functions in the same manner. It should be understood that the arrays 24 and 26 are connected to a similar circuit to that shown in FIG. 3.

One suitable example of each of the ADCs 30 and 32 is an analog to digital converter sold by Datel Systems, Inc., Canton, Mass. as model ADC-UH6B. Each of the ADCs 30 and 32 supplies five bits as an output to five of the data latches 31 with each of the bits being supplied to a different one of the data latches 31. When the ADCs 30 and 32 are Datel model ADC-UH6B, the uppermost bit from each of the ADCs 30 and 32 is not used since only five bits are supplied to the data latches 31. One suitable example of the data latches 31 is quadruple D-type flip-flops with clear sold by Texas Instruments as model SN74175.

Figure 4:
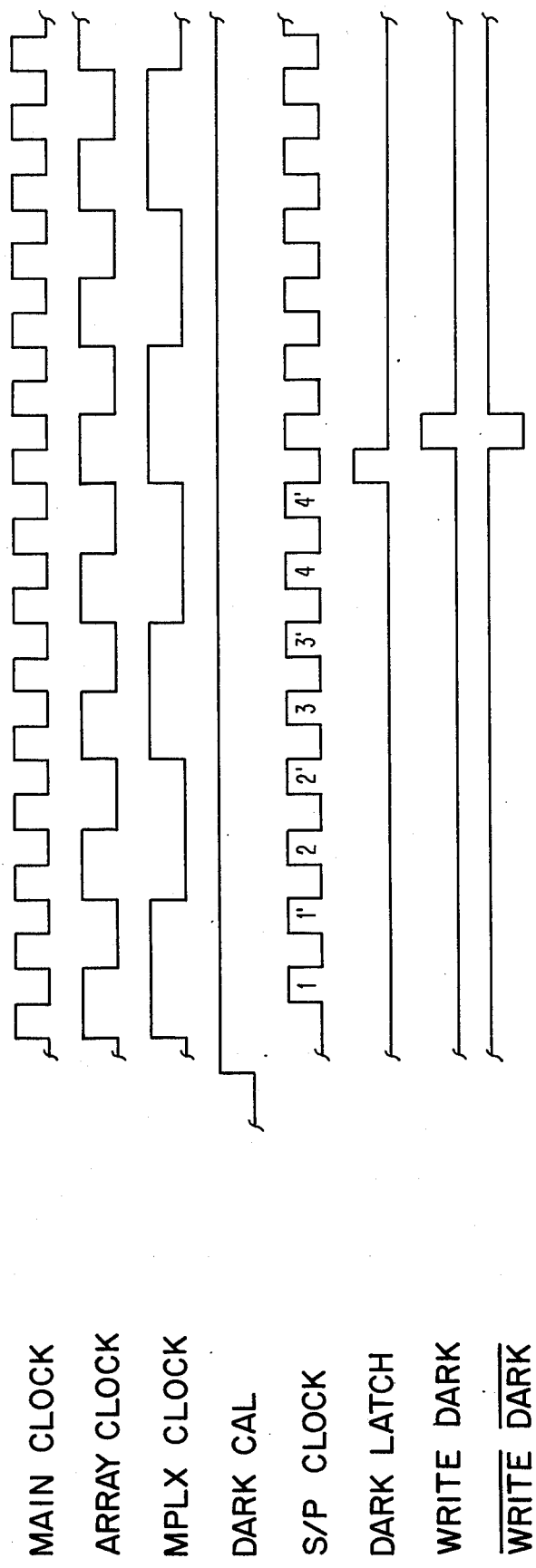
FIG. 4 is a timing diagram showing the relationship of various clock pulses during a dark scan cycle.
Figure 5:
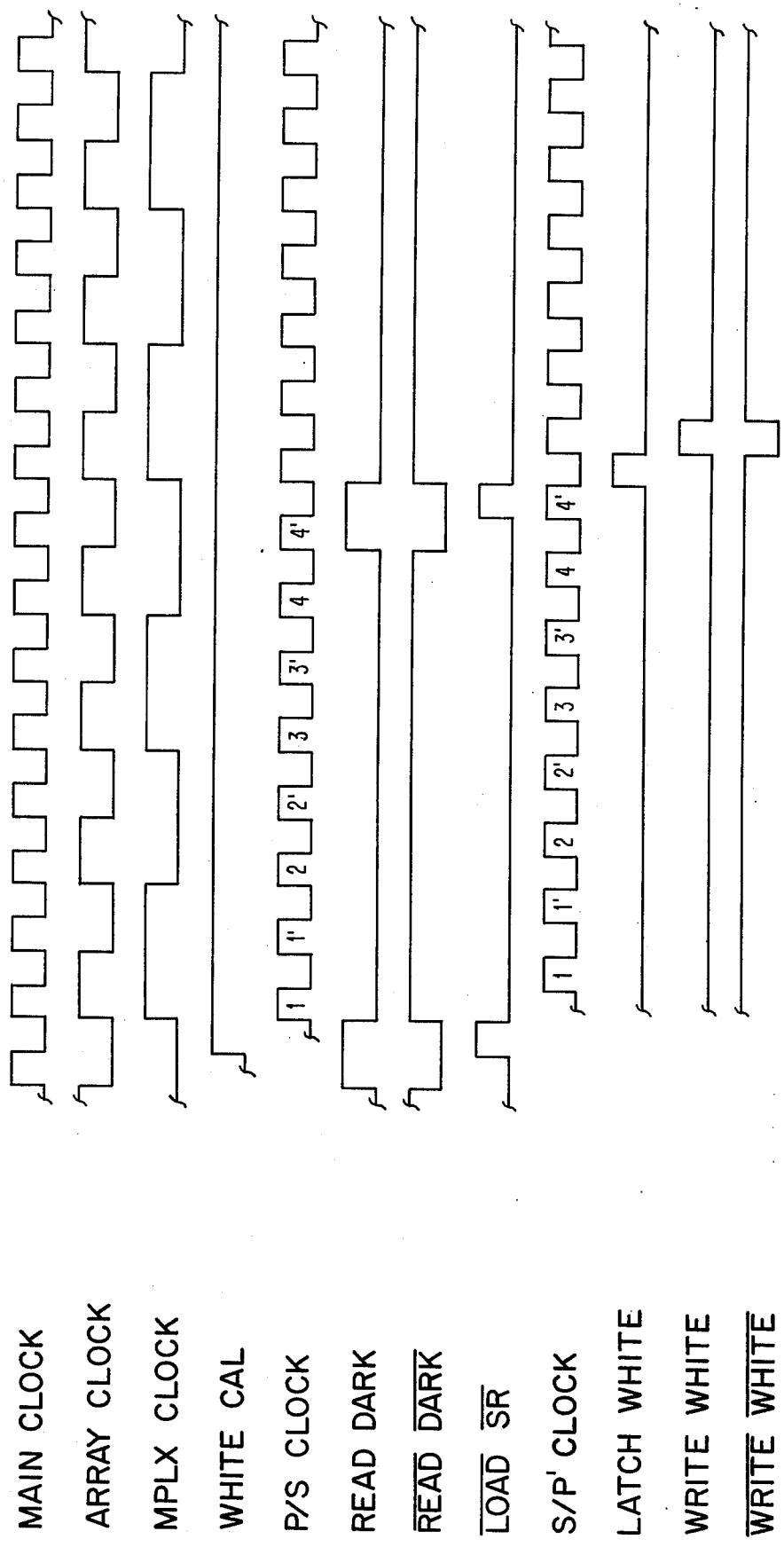
FIG. 5 is a timing diagram showing the relationship of various clock pulses during a white scan cycle.

The digital outputs from the ADC 30 and the ADC 32 are simultaneously latched in the data latches 31. This occurs in response to an ARRAY CLOCK signal. As shown in FIGS. 4–6, the frequency of the ARRAY CLOCK signal is twice the frequency of the MPLX CLOCK signal and one-half the frequency of a MAIN CLOCK signal. The data latches 31 latch the digital bits from the ADC 30 and the ADC 32 only when the ARRAY CLOCK signal goes up. Thus, the data in the data latches 31 remains therein until the next time that the ARRAY CLOCK signal goes up.

The data latches 31 have their outputs connected to data selectors 33. Each of the data selectors 33 is connected to one of the data latches 31 connected to the ADC 30 and one of the data latches 31 connected to the ADC 32 so that a bit from each of the ADCs 30 and 32 having the same relation to the other bits from the same ADC is supplied to the same data selector 33. That is, the most significant bit from each of the ADCs 30 and 32, for example, is supplied to the same data selector 33.

One suitable example of the data selectors 33 is a quadruple 2-line-to-1-line data selector/multiplexer sold as model SN74157 by Texas Instruments. The ARRAY CLOCK signal is supplied to the data selectors 33 so that each change in state of the ARRAY CLOCK signal causes the data selectors 33 to supply the five bits from a different one of the ADCs 30 and 32 to an adder 35.

When a DARK CALIBRATION signal, which is a gate signal, is up and this is only during a dark scan cycle, S/P CLOCK signals, which are supplied to a serial to parallel shift register 36, are produced. This results in the three lowermost bits from the data selectors 33 being supplied to the shift register 36. When the DARK CALIBRATION signal is not up and this is during any cycle except a dark scan cycle, the three lowermost bits from the data selectors 33 are not clocked into the shift register 36 because the S/P CLOCK signals are not produced. Thus, the only time that the data selectors 33 supply the three lowermost bits to the shift register 36 is when a dark scan cycle is employed to determine the noise level produced by each of the light sensors of the arrays 23 and 25 when the document 15 is not illuminated by the light source 17.

One suitable example of the shift register 36 is an 8-bit parallel-out serial shift register sold as model SN74164 by Texas Instruments. One suitable example of the adder 35 is a dual-carry save adder sold as model SN74H183 by Texas Instruments.

The shift register 36 must comprise three of the Texas Instruments model SN74164 shift registers because each light sensor of a group of eight of the light sensors of the arrays 23 and 25 (The group of eight light sensors comprises four light sensors from the array 23 and four light sensors from the array 25 having the same location in the array 25 as the four light sensors of the array 23 have in the array 23.) supplies three bits of data simultaneously to the shift register 36. Accordingly, the lowermost bit of the three bits of data for a specific light sensor is transmitted to one of the Texas Instruments shift registers, the middle of the three bits of data is transmitted to a second Texas Instruments shift register, and the uppermost bit of the three bits of data is transmitted to the third Texas Instruments shift register.

When the DARK CALIBRATION signal is up and the S/P CLOCK signal, which is supplied to the shift register 36, goes up, the three bits from the data selectors 33 are shifted into the shift register 36. At the end of the eight of the S/P CLOCK signals going up, twenty-four bits will have been transmitted to the shift register 36 and be present therein. The S/P CLOCK signal goes up when the MAIN CLOCK signal goes down as shown in FIG. 4.

The shift register 36 has its output of twenty-four bits supplied to twenty-four data latches 37, which are the same as the data latches 31. The data latches 37 latch the data from the shift register 36 only when a DARK LATCH signal is up. This occurs in response to the MAIN CLOCK signal going up. Additionally, the DARK LATCH signal occurs only after every eight S/P CLOCK signals have occurred as shown in FIG. 4 with the DARK LATCH signal going up when the S/P CLOCK signal goes down.

Therefore, latching of the output of the shift register 36 in the data latches 37 occurs only after signals from four of the light sensors of the array 23 and four of the light sensors of the array 25 have been shifted into the shift register 36. The outputs of the first four light sensors of the array 23 are supplied to the shift register 36 by the S/P CLOCK signals 1, 2, 3, and 4 going up. The outputs from the first four light sensors of the array 25 are supplied to the shift register 36 by the S/P CLOCK signals 1', 2', 3', and 4' going up.

Therefore, during a dark scan cycle in which the dark scan noise level from each of the light sensors is to be ascertained, the DARK CALIBRATION signal goes up so that the lowermost three bits of the output of the ADC 30 or the ADC 32 are supplied from the data selectors 33 to the shift register 36 in accordance with the state of the ARRAY CLOCK signal. The ARRAY CLOCK signals insure that the output of the specific light sensor of each of the arrays 23 and 25 is supplied to the shift register 36 in the desired order.

Since the dark scan cycle is attempting to obtain the noise level when the light sensors of the arrays 23 and 25 are not illuminated, it is not necessary to have the two uppermost bits of the output since there should be no signal from the light sensors as this portion of the digital signal indicates substantial light.

As shown in FIG. 4, the DARK LATCH signal goes down at the time that the S/P CLOCK signal goes up again. Thus, latching of the data from the shift register 36 in the data latches 37 is completed before an additional input is received by the shift register 36 from the data selectors 33.

The output of the data latches 37 is transferred to an addressable position within a random access memory (RAM) 38 when a WRITE DARK signal goes high as shown in FIG. 4. This occurs when the DARK LATCH signal goes down. This occurs at the time that the S/P CLOCK signal goes up for the first of the light sensors of the next group of eight having their data stored in the shift register 36.

The RAM 38 comprises three separate random access memories with each having two hundred and fifty-six addressable positions and each of the addressable positions containing eight bits. One of the three random access memories of the RAM 38 receives the lowermost bit of each of the three bits of data, another of the random access memories of the RAM 38 receives the middle bit of each of the three bits of data, and the third of the three random access memories of the RAM 38 receives the uppermost bit of each of the three bits of data. Accordingly, the RAM 38 has two hundred and fifty-six addressable positions with each containing twenty-four bits.

Thus, each addressable position of the RAM 38 contains the data from four of the light sensors of each of the arrays 23 and 25. Therefore, two hundred and fifty-six addressable positions will accommodate the ten hundred and twenty-four elements in each of the arrays 23 and 25.

A memory address counter 39 is connected to the RAM 38 to control the addressable position. The counter 39 counts from zero to two hundred and fifty-five and then starts to count over again. The counter 39 has its count increased one each time that a $\overline{\text{WRITE DARK}}$ signal, which is supplied to the counter 39 through an OR gate 40, goes up. As shown in FIG. 4, this occurs when the WRITE DARK signal goes down so that the new address in the RAM 38 is selected after completion of writing. The counter 39 is reset to zero after it has counted to two hundred and fifty-five.

When all of the 1024 light sensors of each of the arrays 23 and 25 have supplied outputs in the absence of illumination, then the DARK CALIBRATION signal goes down. This stops further clocking of data from the data selectors 33 into the shift register 36. After the dark scan cycle is completed, then a white scan cycle is undertaken to determine the variations in light conditions to which each of the light sensors of the arrays 23 and 25 is subjected from the light source 17.

During any cycle except a dark scan cycle, the RAM 38 supplies twenty-four bits from each of its addressable positions to a parallel to serial shift register 41. One suitable example of the shift register 41 is a parallel-load 8-bit shift register sold as model SN74165 by Texas Instruments.

The shift register 41 must comprise three of the Texas Instruments model SN74165 shift registers because a total of twenty-four bits must be received from the RAM 38 by the shift register 41 at one time. Thus, the lowermost bit of the three bits of data for each light sensor of each group of eight light sensors is supplied to one of the Texas Instruments shift registers, the middle bit of the three bits of data for each light sensor of each group of eight light sensors is supplied to another of the Texas Instruments shift registers, and the uppermost bit of the three bits of data for each light sensor of each group of eight light sensors is supplied to the third of the Texas Instruments shift registers.

The RAM 38 supplies twenty-four bits from one of its addresses to the shift register 41 each time that a READ DARK signal goes up. As shown in FIGS. 5 and 6, the READ DARK signal goes up before any data is received from any of the light sensors of the arrays 23 and 25 and is at the same time that the MAIN CLOCK signal goes up. The READ DARK signal goes down when the ARRAY CLOCK signal goes up to cause the first of the light sensors of each of the arrays 23 and 25 to have data from the ADCs 30 and 32 latched in the data latches 31.

The twenty-four bits from the address in the RAM 38 is loaded into the shift register 41 when a $\overline{\text{LOAD SR}}$ signal goes up. As shown in FIGS. 5 and 6, this occurs after the READ DARK signal goes up and is when the MAIN CLOCK signal goes down. The $\overline{\text{LOAD SR}}$ signal goes down at the same time that the READ DARK signal goes down. Each of the READ DARK and $\overline{\text{LOAD SR}}$ signals goes down when the MPLX CLOCK signal goes up and the ARRAY CLOCK signal goes up to enable the data latches 31 to latch the data from the first light sensor of each of the arrays 23 and 25 in the data latches 31.

At this time, a P/S CLOCK signal, which is supplied to the shift register 41, goes up. This causes the first three bits of the twenty-four bits in the shift register 41 to be transferred through inverters 42 to the adder 35. By utilization of the inverters 42, the adder 35 subtracts the output from the shift register 41 from the input from the data selectors 33. This is because the addition of two digital numbers in which one of the numbers is a complement of its actual number with one being added to the sum produces subtraction.

As shown in FIGS. 5 and 6, the P/S CLOCK signal to the shift register 41 goes up each time that the ARRAY CLOCK signal changes state. Thus, the compensation factor for the dark scan noise level in each of the light sensors of the arrays 23 and 25 is supplied to the adder 35 at the same time that the output from the same sensor of the array 23 or 25 is supplied to the adder 35.

After a dark scan cycle has occurred in which the light sensors of the arrays 23 and 25 have received no light, a white stripe 43 (see FIG. 1) on one end of the document glass 14 has the arrays 23–26 focused thereon with the light source 17 providing light. The white stripe 43 is a uniform contrast white document. The arrays 23–26 are focused only during a white scan cycle, which is when a WHITE CALIBRATION signal goes up.

The output from the adder 35 for each of the light sensors of the arrays 23 and 25 has compensation for the dark scan noise level. Thus, when the light sensors of the arrays 23–26 are focused on the white stripe 43, the output from the adder 35 for each of the light sensors represents the signal produced by the white stripe 43 after compensation for the dark scan noise level.

During a white scan cycle, the WHITE CALIBRATION signal, which is a gate signal, is up so that S/P' CLOCK signals, which are supplied to a serial to parallel shift register 45, are produced. This results in the lowermost four bits of the five bits from the adder 35 being supplied to the shift register 45. During any other cycle except a white scan cycle, the WHITE CALIBRATION signal is down so that the shift register 45 does not receive the four bits from the adder 35. During any cycle, the five bits are supplied from the adder 35 to five data latches 46, which are the same as the data latches 31.

The reason for supplying the lowermost four bits from the adder 35 to the shift register 45 is because only the uppermost fifty percent of the signal from the light sensors of the arrays 23 and 25 will be used during a white scan cycle. With five bits representing zero to thirty-one, the uppermost bit of the five bits represents sixteen and can be ignored because the variations will be from sixteen to thirty-one. That is, only the lowermost four bits will change for numbers from sixteen to thirty-one since sixteen will remain a constant.

The shift register 45 is the same as the shift register 36 except that the shift register 45 shifts thirty-two bits at a time to data latches 47, which are the same as the data latches 31. Thus, the shift register 45 is formed by four of the Texas Instruments model SN74165 shift registers since each is capable of only holding eight bits. Each of these four Texas Instruments shift registers receives one bit of data from each of the light sensors with this being the same bit in the four bits of data for each light sensor.

The shift register 45 has the S/P' CLOCK signal supplied thereto only when the WHITE CALIBRATION signal is up. As shown in FIG. 5, the S/P' CLOCK signal goes up at the same time that the P/S CLOCK signal, which is supplied to the shift register 41, goes down. The S/P' CLOCK signal goes up each time that the MAIN CLOCK signal goes down. This provides sufficient time for the adder 35 to complete the subtraction and still supply the signal for the specific light sensor of the array 23 or 25 to the shift register 45.

After thirty-two bits have been received by the shift register 45 to represent data from four of the light sensors of the array 23 and four of the light sensors of the array 25, a LATCH WHITE signal, which is supplied to the data latches 47, goes up to latch the thirty-two bits from the shift register 45 within the data latches 47. As shown in FIG. 5, the LATCH WHITE signal goes up after every eight of the S/P' CLOCK signals have been supplied to the shift register 45 so that all thirty-two bits have been received therein. At the time that the S/P' CLOCK signal goes down, the LATCH WHITE signal goes up. (This is when the READ DARK and $\overline{\text{LOAD SR}}$ signals go down.) Thus, the shift register 41 has new compensation data for transfer to the adder 35 after each group of eight light sensors (four from the array 23 and four from the array 25) has supplied outputs to the adder 35.

The data latches 47 are connected to a random access memory (RAM) 48. The RAM 48 comprises four separate random access memories with each having two hundred and fifty-six addressable positions and each of the addressable positions containing eight bits. One of the four random access memories of the RAM 48 receives the lowermost bit of each of the four bits of data, a second of the random access memories of the RAM 48 receives the second lowest bit of each of the four bits of data, a third of the four random access memories of the RAM 48 receives the next to the highest bit of each of the four bits of data, and a fourth of the four random access memories of the RAM 48 receives the uppermost bit of each of the four bits of data. Accordingly, the RAM 48 has two hundred and fifty-six addressable positions with each storing thirty-two bits. Thus, each time that the data latches 47 latch new data therein, it is transferred to a new address within the RAM 48.

As shown in FIG. 5, a WRITE WHITE signal goes up at the time that the LATCH WHITE signal goes down. The supply of the WRITE WHITE signal to the RAM 48 causes the data, which has been latched in the data latches 47 by the LATCH WHITE signal, to be transferred to the RAM 48.

A memory address counter 49 is connected to the RAM 48. The counter 49, which counts from zero to two hundred and fifty-five and is then reset to zero, counts one each time that a $\overline{\text{WRITE WHITE}}$ signal, which is supplied to the counter 49 through an OR gate 50, goes up. Thus, each time that the $\overline{\text{WRITE WHITE}}$ signal goes up, the counter 49 causes the RAM 48 to receive the data from the data latches 47 in another addressable position.

The WHITE CALIBRATION signal stays up until all 1024 of the light sensors of the array 23 and all 1024 of the light sensors of the array 25 have produced an output and this data has been stored in the RAM 48. The data stored in the RAM 48 for each of the addresses is the output from a different one of the groups of eight of the sensors (four of the light sensors of the array 23 and four of the light sensors of the array 25) when the arrays 23–26 are focused on the white stripe 43 on the document glass 14. The signal from each of the light sensors has been corrected separately for the dark scan noise level. The stored data in the RAM 48 for each of the light sensors is utilized to change the signal from the same light sensor during any cycle except a dark scan cycle or a white scan cycle so that the outputs of the light sensors are normalized for the variations in light conditions.

During any cycle except a dark scan cycle or a white scan cycle, a READ WHITE signal is supplied to the RAM 48. Each time that a READ WHITE signal is applied to the RAM 48, the data in one of the addresses in the RAM 48 is transferred to a parallel to serial shift register 51, which is the same as the shift register 41.

The shift register 51 must comprise four of the Texas Instruments model SN74165 shift registers because a total of thirty-two bits must be received from the RAM 48 at one time. Thus, the lowermost bit of the four bits of data for each light sensor of each group of eight light sensors is supplied to one of the Texas Instruments shift registers, the second lowermost bit of the four bits of data for each light sensor of each group of eight light sensors is supplied to another of the Texas Instruments shift registers, the next to the highest bit of the four bits of data for each light sensor of each group of eight light sensors is supplied to a third of the four Texas Instruments shift registers, and the uppermost bit of the four bits of data for each light sensor of each group of eight light sensors is supplied to a fourth of the four Texas Instruments shift registers.

The memory address counter 49 receives a $\overline{\text{READ WHITE}}$ signal through the OR gate 50 so that the memory address counter 49 counts one each time that the READ WHITE signal goes down to cause the next of the addresses in the RAM 48 to have its data ready for transfer to the shift register 51. Thus, thirty-two bits are transferred from the RAM 48 to the shift register 51 each time that the $\overline{\text{LOAD SR}}$ signal, which also is supplied to the shift register 41, goes up and the READ WHITE signal is up.

The thirty-two bits in the shift register 51 are clocked four bits at a time to four data latches 52, which are the same as the data latches 31, in accordance with when the P/S CLOCK signal goes up. The RAM 48 supplies the signals to the shift register 51 only when the READ WHITE signal is up, and this occurs when there is no white scan or dark scan cycle. Thus, the data stored in the RAM 48 for each of the addresses is utilized to cause the output from each of the light sensors of each of the arrays 23 and 25 to be corrected for variations in light conditions after having been corrected at the adder 35 for dark scan noise level.

The four bits supplied from the shift register 51 to the data latches 52 by each of the P/S CLOCK signals are latched in the data latches 52 by a LATCH ROM signal. The LATCH ROM signal latches the four bits of data in the data latches 52 for use with a look-up table of a read only memory (ROM) 53.

The look-up table of the ROM 53 is set up so that the four bits of data from the RAM 48 for a specific light sensor of the arrays 23 and 25 cause normalization of the signal from the data latches 46 while correcting for the non-uniform gain factor due to variations in light conditions. The data latches 46 latch the five bits of data from the adder 35 whenever a LATCH VIDEO signal is up. As shown in FIG. 6, the LATCH VIDEO signal is up when the LATCH ROM signal is up. This is during any cycle other than a white scan cycle.

The output from the look-up table of the ROM 53 is a signal, which has been corrected in accordance with the input from the RAM 48 and the input from the data latches 46 for a specific light sensor of the array 23 or 25. The look-up table of the ROM 53 normalizes the outputs from the adder 35. The outputs from the adder 35 have been compensated for the dark scan noise level in the adder 35.

Thus, during a white scan cycle, the output from each of the light sensors of each of the arrays 23 and 25 is stored in the RAM 48 in a specific location. This data is then utilized during all other cycles to supply a signal to the ROM 53 when the same light sensor of the array 23 or 25 has its output supplied to the ROM 53 from the data latches 46. As a result, the look-up table of the ROM 53 produces a four bit output, which has been compensated for variations in light conditions and dark scan noise level.

Accordingly, the signal from the data latches 46 to the ROM 53 is normalized by the ROM 53 in accordance with the calibration correction obtained during the white scan cycle for the specific light sensor of the array 23 or 25. This normalizing is a reduction of the output signal from the data latches 46 and is due to the non-uniform gain factor. Therefore, the output from the ROM 53 for each of the light sensors of each of the arrays 23 and 25 has been corrected for both dark scan noise level and non-uniform gain factor.

The look-up table of the ROM 53 is formed with sixteen columns and thirty-two rows to comprise a matrix having five hundred and twelve addressable positions. The output from each of these addressable positions is a four bit output.

Accordingly, the thirty-two rows in the look-up table vary in magnitude from 0 to 31 since this is the range of magnitude provided by the five bits of data from the data latches 46. The columns are responsive to signals having magnitudes varying from 0 to 15 because the lowermost four bits of data are supplied to the RAM 48 during a white scan cycle and from the RAM 48 to the ROM 53 during any other cycle. Thus, the magnitude of the signal stored in the RAM 48 determines which of the columns is selected.

The output signal from the look-up table for a specific column and a specific row is determined by the intersection of that row and column. The output from the look-up table varies from 0 to 15 since this is the range provided by the four bits of output data.

Figure 3:
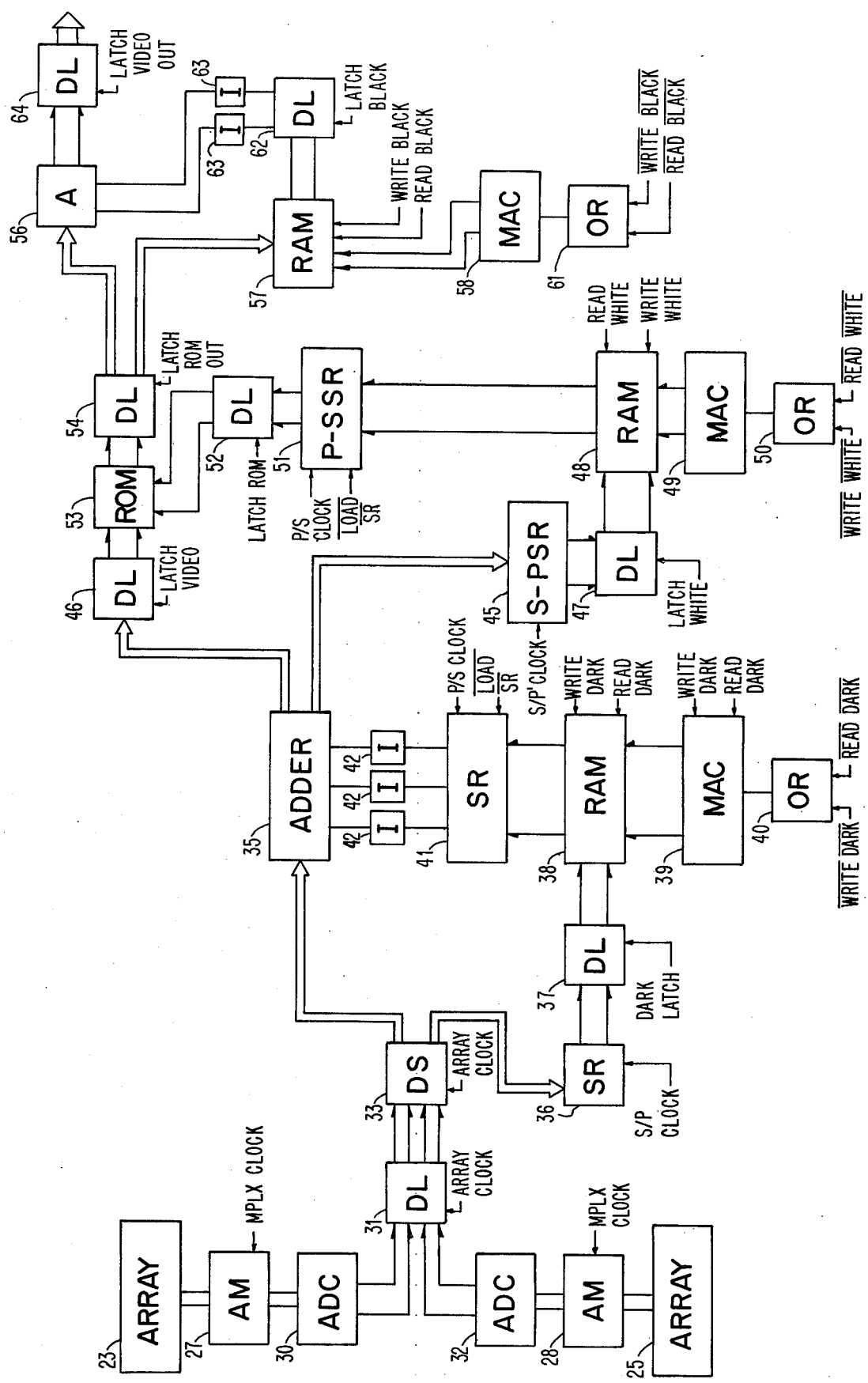
FIG. 3 is a schematic block diagram of an apparatus for dynamically compensating the signals for individual light sensors of the arrays of the scanner.

Therefore, the look-up table of the ROM 53 normalizes the input signal from the data latches 46 while correcting for non-uniform gain factor due to variations in light conditions. The specific look-up table used with the circuit of FIG. 3 is as follows:

| | INPUT FROM THE DATA LATCHES 52 | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 |
| 2 | 2 | 2 | 2 | 2 | 1 | 1 | 1 | 1 | 1 | 1 | 1 | 1 | 1 | 1 | 1 | 1 |
| 3 | 3 | 3 | 2 | 2 | 2 | 2 | 2 | 2 | 2 | 2 | 2 | 2 | 2 | 2 | 1 | 1 |
| 4 | 4 | 4 | 3 | 3 | 3 | 3 | 3 | 3 | 2 | 2 | 2 | 2 | 2 | 2 | 2 | 2 |
| 5 | 5 | 4 | 4 | 4 | 4 | 4 | 3 | 3 | 3 | 3 | 3 | 3 | 3 | 3 | 2 | 2 |
| 6 | 6 | 5 | 5 | 5 | 4 | 4 | 4 | 4 | 4 | 4 | 3 | 3 | 3 | 3 | 3 | 3 |
| 7 | 7 | 6 | 6 | 6 | 5 | 5 | 5 | 5 | 4 | 4 | 4 | 4 | 4 | 4 | 3 | 3 |
| 8 | 8 | 7 | 7 | 7 | 6 | 6 | 6 | 5 | 5 | 5 | 5 | 5 | 4 | 4 | 4 | 4 |

-continued

| | | \multicolumn{16}{c}{INPUT FROM THE DATA LATCHES 52} |
|---|---|---|---|---|---|---|---|---|---|---|---|---|---|---|---|---|
| | | 9 | 8 | 8 | 7 | 7 | 7 | 6 | 6 | 6 | 6 | 5 | 5 | 5 | 5 | 5 | 4 | 4 |
| | | 10 | 9 | 9 | 8 | 8 | 7 | 7 | 7 | 7 | 6 | 6 | 6 | 6 | 5 | 5 | 5 | 5 |
| | | 11 | 10 | 10 | 9 | 9 | 8 | 8 | 7 | 7 | 7 | 7 | 6 | 6 | 6 | 6 | 5 | 5 |
| | | 12 | 11 | 11 | 10 | 9 | 9 | 9 | 8 | 8 | 7 | 7 | 7 | 7 | 6 | 6 | 6 | 6 |
| INPUT | | 13 | 12 | 11 | 11 | 10 | 10 | 9 | 9 | 8 | 8 | 8 | 7 | 7 | 7 | 7 | 6 | 6 |
| FROM/ | 14 | 13 | 12 | 12 | 11 | 10 | 10 | 10 | 9 | 9 | 8 | 8 | 8 | 7 | 7 | 7 | 7 |  |
| THE | | 15 | 14 | 13 | 12 | 12 | 11 | 11 | 10 | 10 | 9 | 9 | 9 | 8 | 8 | 8 | 7 | 7 |
| DATA | | 16 | 15 | 14 | 13 | 13 | 12 | 11 | 11 | 10 | 10 | 10 | 9 | 9 | 9 | 8 | 8 | 8 |
| LATCHES | | 17 | 15 | 15 | 14 | 13 | 13 | 12 | 12 | 11 | 11 | 10 | 10 | 9 | 9 | 9 | 8 | 8 |
| 46 | | 18 | 15 | 15 | 15 | 14 | 13 | 13 | 12 | 12 | 11 | 11 | 10 | 10 | 10 | 9 | 9 | 9 |
| | | 19 | 15 | 15 | 15 | 15 | 14 | 14 | 13 | 12 | 12 | 11 | 11 | 11 | 10 | 10 | 9 | 9 |
| | | 20 | 15 | 15 | 15 | 15 | 15 | 14 | 14 | 13 | 12 | 12 | 12 | 11 | 11 | 10 | 10 | 10 |
| | | 21 | 15 | 15 | 15 | 15 | 15 | 15 | 14 | 14 | 13 | 13 | 12 | 12 | 11 | 11 | 10 | 10 |
| | | 22 | 15 | 15 | 15 | 15 | 15 | 15 | 15 | 14 | 14 | 13 | 13 | 12 | 12 | 11 | 11 | 11 |
| | | 23 | 15 | 15 | 15 | 15 | 15 | 15 | 15 | 15 | 14 | 14 | 13 | 13 | 12 | 12 | 11 | 11 |
| | | 24 | 15 | 15 | 15 | 15 | 15 | 15 | 15 | 15 | 15 | 14 | 14 | 13 | 13 | 12 | 12 | 12 |
| | | 25 | 15 | 15 | 15 | 15 | 15 | 15 | 15 | 15 | 15 | 15 | 14 | 14 | 13 | 13 | 12 | 12 |
| | | 26 | 15 | 15 | 15 | 15 | 15 | 15 | 15 | 15 | 15 | 15 | 15 | 14 | 14 | 13 | 13 | 13 |
| | | 27 | 15 | 15 | 15 | 15 | 15 | 15 | 15 | 15 | 15 | 15 | 15 | 15 | 14 | 14 | 13 | 13 |
| | | 28 | 15 | 15 | 15 | 15 | 15 | 15 | 15 | 15 | 15 | 15 | 15 | 15 | 15 | 14 | 14 | 14 |
| | | 29 | 15 | 15 | 15 | 15 | 15 | 15 | 15 | 15 | 15 | 15 | 15 | 15 | 15 | 15 | 14 | 14 |
| | | 30 | 15 | 15 | 15 | 15 | 15 | 15 | 15 | 15 | 15 | 15 | 15 | 15 | 15 | 15 | 15 | 15 |
| | | 31 | 15 | 15 | 15 | 15 | 15 | 15 | 15 | 15 | 15 | 15 | 15 | 15 | 15 | 15 | 15 | 15 |

The four bit output from the ROM 53 is supplied to four data latches 54, which are the same as the data latches 31. The data latches 54 have the data latched therein when a LATCH ROM OUT signal goes high. As shown in FIG. 6, this occurs at the time that the LATCH VIDEO and the LATCH ROM signals go down and is when the MAIN CLOCK signal goes up.

The data latches 54 supply four bits of data to an adder 56, which is the same as the adder 35. When a BLACK CALIBRATION signal is up, the lowermost two bits are clocked from the data latches 54 into a random access memory (RAM) 57, which has a memory address counter 58 connected thereto.

The RAM 57 has two hundred and fifty-six addressable positions with each holding two bits of data. Thus, the total number of addressable positions in the RAM 57 is the same as in the RAM 38 and the RAM 48.

During a black scan cycle, the RAM 57 has a WRITE BLACK signal supplied thereto once for every eight P/S CLOCK signals as shown in FIG. 6. Thus, the RAM 57 stores only the output from one light sensor of the group of eight light sensors. This group of eight light sensors represents data from four of the light sensors of the array 23 and four of the light sensors of the array 25.

During a black scan cycle, the arrays 23–26 are focused on a black stripe 60, which is on the same end of the document glass 14 as the white stripe 43. The black stripe 60 is illuminated by the light source 17.

The counter 58, which counts from zero to two hundred and fifty-five and is then reset to zero, has a WRITE BLACK signal supplied thereto through an OR gate 61 during a black scan cycle. Thus, the counter 58 moves the address in the RAM 57 each time that storing of the data from the data selectors 55 in an addressable position in the RAM 57 is completed.

During any cycle except a black scan cycle, a READ BLACK signal goes up once for every group of eight light sensors. As shown in FIG. 6, the READ BLACK signal goes up at the same time that the first of a group of eight of the LATCH ROM OUT signals goes up. When the READ BLACK signal is up, the RAM 57 supplies the data from an address in the RAM 57 to four data latches 62, which are the same as the data latches 31.

When the READ BLACK signal goes down, a LATCH BLACK signal goes up as shown in FIG. 6. This occurs when the MAIN CLOCK signal goes down. When the MAIN CLOCK signal again goes up, the LATCH BLACK signal goes down. When the LATCH BLACK signal is up, the data from the RAM 57 is latched in the data latches 62.

The data latches 62 are connected through two inverters 63, which are the same as the three inverters 42, to the adder 56. Thus, in any cycle except a black scan cycle, the two bits from the data latches 62 are subtracted from the lowermost two bits of the four bits supplied to the adder 56 from the data latches 54 to produce a signal at the output of the adder 56 in which there has been a change for variations due to scanning a black area in the presence of illumination.

The counter 58 has a $\overline{\text{READ BLACK}}$ signal also supplied thereto through the OR gate 61. When the $\overline{\text{READ BLACK}}$ signal goes up at the time that the READ BLACK signal goes down, the counter 58 increases its count by one to select another of the addresses in the RAM 57 for use when the next READ BLACK signal goes up.

The output of the adder 56 is supplied to four data latches 64, which are the same as the data latches 31. The data latches 64 latch the data therein when a LATCH VIDEO OUT signal goes up. As shown in FIG. 6, this occurs at the same time as when the LATCH VIDEO and the LATCH ROM signals are up. Thus, the adder 56 has a different input from the data latches 62 for every group of eight of the light sensors of the arrays 23 and 25. The correction for a black document in the presence of illumination is the same for four of the light sensors of the array 23 and four of the light sensors of the array 25.

The data latches 64 supply their digital output as the signal, which has been corrected for the non-uniform gain factor, dark scan noise level, and variation caused by a black document in the presence of illumination at each of the light sensors. Thus, each output from the data latches 64 accurately represents the level of light by a specific light sensor.

Considering the operation of the present invention, the first cycle is a dark scan cycle in which the DARK CALIBRATION signal is up. This occurs with the light source 17 turned off. Thus, any signal produced from each of the light sensors of the arrays 23 and 25 is due to noise produced by the particular individual light sensor because of fixed pattern noise and sensor leakage.

During the dark scan cycle, the DARK CALIBRATION signal is up so that the three lowermost bits of data from the data selectors 33 are clocked to the shift register 36. Each three bits of data from the data selectors 33 enter the shift register 36 when one of the S/P CLOCK signals goes up as shown in FIG. 4.

After the shift register 36 has the data from four of the light sensors of the array 23 and four of the light sensors of the array 25, the DARK LATCH signal goes up to latch the data from the shift register 36 in the data latches 37. This is when the eighth S/P CLOCK signal goes down.

After the DARK LATCH signal goes down at the time that the first S/P CLOCK signal of the next group of eight goes up, the WRITE DARK signal goes up as shown in FIG. 4. This causes the data in the data latches 37 to be stored in one of the addresses in the RAM 38.

Thus, after the WRITE DARK signal has gone up two hundred and fifty-six times, all of the 1024 light sensors of the array 23 and the 1024 light sensors of the array 25 have supplied an output for dark scan noise level. Each of these outputs has been stored in the RAM 38 for the specific light sensor. Thus, the RAM 38 has the correction factor for dark scan noise level for each of the light sensors stored at a specific location.

A white scan cycle occurs next in which the arrays 23–26 have their light sensors focused on the white stripe 43 on the document glass 14. The WHITE CALIBRATION signal goes up and stays up throughout the white scan cycle.

During any scan cycle except a dark scan cycle, the READ DARK signal (see FIGS. 5 and 6) is up once for every eight times that the MAIN CLOCK signal is up so that the RAM 38 can transfer the data therein to the shift register 41. During any cycle in which the READ DARK signal is up, the $\overline{\text{LOAD SR}}$ signal also goes up as shown in FIGS. 5 and 6. The RAM 38 serially transfers the dark scan noise level correction factor for each of four of the light sensors of the array 23 and each of four of the light sensors of the array 25 to the shift register 41 when the $\overline{\text{LOAD SR}}$ signal goes up.

The P/S CLOCK signals go up each time that the ARRAY CLOCK signal changes state with the first P/S CLOCK signal going up at the same time that the READ DARK and $\overline{\text{LOAD SR}}$ signals go down as shown in FIGS. 5 and 6. Thus, the correction factor for the first light sensor of the array 23 is supplied to the adder 35 at the same time that the data from the ADC 30 for the same light sensor is latched in the data latches 31. Therefore, the adder 35 has the correction factor for the same light sensor supplied thereto from the shift register 41 at the same time that the data latches 31 are supplying an output to the adder 35. Because of the inverters 42, the adder 35 subtracts the output of the shift register 41 from the output from the data selectors 33 and adds one to the sum.

The output from the adder 35 is a signal, which has been compensated for the dark scan noise level. The lowermost four bits of the five bit output of the adder 35 are clocked to the shift register 45 because the WHITE CALIBRATION signal is up. Thus, during a white scan cycle, the lowermost four bits of data from each of the four light sensors of the array 23 and each of the four light sensors of the array 25 are transferred to the shift register 45 under control of the S/P' CLOCK signal. The S/P' CLOCK signal goes up each time that the P/S CLOCK signal goes down. Thus, the four data bits from the adder 35 for each light sensor are entered in the shift register 45 after correction for the dark scan noise level.

After the shift register 45 has received the four data bits for each light sensor of the group of eight light sensors of the arrays 23 and 25, the data is transferred to the data latches 47 by the LATCH WHITE signal going up at the time that every eighth of the S/P' CLOCK signals goes down as shown in FIG. 5. When the LATCH WHITE signal goes down, the WRITE WHITE signal goes up to enable the data in the data latches 47 to be stored in the RAM 48 at the desired address.

The WHITE CALIBRATION signal goes down after all 1024 of the light sensors of the array 23 and all 1024 of the light sensors of the array 25 have transmitted outputs to the RAM 48. These stored signals in the RAM 48 will be used for supply to the ROM 53 during any cycle in which the DARK CALIBRATION or the WHITE CALIBRATION signal is not up.

A black scan cycle occurs next. During the black scan cycle, the BLACK CALIBRATION signal goes up, and the arrays 23–26 are focused on the black stripe 60 on the document glass 14 with the black stripe 60 illuminated by the light source 17.

The data latches 46 latch the data, which has been corrected at the adder 35 for dark scan noise level, from the adder 35 when the LATCH VIDEO signal goes up. This is when the P/S CLOCK signal goes down as shown in FIG. 6. At the same time, the stored signal in the RAM 48 for the same light sensor is latched in the data latches 52 by the LATCH ROM signal going up.

The stored signal in the RAM 48 for each of the light sensors is a signal representing the maximum output from the specific light sensor when the arrays 23–26 are focused on the white stripe 43 on the document glass 14 and the signal has been corrected for dark scan noise level. The magnitude of this signal in the RAM 48 is used in the ROM 53 to select one of the columns in the look-up table of the ROM 53.

The five bits of data from the data latches 46 result in selection of one of the rows in the look-up table of the ROM 53. As a result, the ROM 53 provides an output of four bits of data in accordance with the selected column and the selected row in the look-up table.

The maximum output from the ROM 53 is approximately one-half that of its maximum input from the data latches 46. In addition to normalizing the signal from the data latches 46, the output from the ROM 53 also contains correction for variations in light conditions due to the input from the RAM 48.

The output signals from the ROM 53 are latched in the data latches 54 each time that the LATCH ROM OUT signal goes up. The LATCH ROM OUT signal goes up each time that the LATCH VIDEO and the LATCH ROM signals go down as shown in FIG. 6.

During a black scan cycle, the BLACK CALIBRATION signal is up so that, as shown in FIG. 6, the WRITE BLACK signal goes up only once for every eight times that the LATCH ROM OUT signal goes up. Thus, only one of each group of eight outputs from the ROM 53 has its two lowermost bits stored in the RAM 57.

The BLACK CALIBRATION signal goes down after all 1024 of the light sensors of the array 23 and all 1024 of the light sensors of the array 25 have transmitted their outputs to the data latches 54. One of each group of eight outputs is stored in the RAM 57 and is used for supply to the adder 56 during any cycle in which none of the DARK CALIBRATION, WHITE CALIBRATION, and BLACK CALIBRATION signals is up.

With none of the DARK CALIBRATION, WHITE CALIBRATION, and BLACK CALIBRATION signals being up, the light sensors of each of the arrays 23-26 sense the level of the light on the document 15 at each of 1024 different positions across the width of the document 15 so that a total of 4,096 positions has the level of light sensed. It should be understood that the housing 11 is continuously moved relative to the document 15 during scanning by the drive mechanism connected to the cable 16.

When the arrays 23-26 are Fairchild model CCD131 sensor, movement of the light with respect to the document 15 has no effect on the signals from the light sensors. This is because the Fairchild model CCD131 sensor simultaneously transfers the outputs from every other one of the light sensors to a first analog shift register in parallel and simultaneously transfers the outputs of the remainder of the light sensors to a second analog shift register in parallel shortly after completing transfer of the outputs to the first analog shift register.

An output signal from one of the light sensors of each of the four arrays 23-26 is supplied at the same time. The simultaneous output from one of the light sensors of each of the four arrays 23-26 is from the light sensor located in the same location in each of the four arrays 23-26.

The outputs from a light sensor in each of the arrays 23 and 25 are transmitted simultaneously to the ADCs 30 and 32, respectively, by the multiplexers 27 and 28, respectively, when the MPLX CLOCK signal changes state. Likewise, the outputs from a light sensor in each of the arrays 24 and 26 would be similarly transmitted at the same time to ADCs, which correspond to the ADCs 30 and 32, respectively, in another circuit like that of FIG. 3 for the arrays 23 and 25.

It should be understood that the frequency of the clock signals for the ADC 30 and the ADC 32 is higher than the frequency of the MPLX CLOCK signals. This is necessary to enable the ADC 30 or 32 to receive the analog data, convert the analog signal to digital data, and ascertain that the digital signal is ready for supply to the data latches 31.

The five bits of data from the ADC 30 and the five bits of data from the ADC 32 are latched in the data latches 31 when the ARRAY CLOCK signal goes up. The data selectors 33 supply the five bits from one of the ADCs 30 and 32 to the adder 35 when the ARRAY CLOCK signal is up and the five bits from the other of the ADCs 30 and 32 to the adder 35 when the ARRAY CLOCK signal is down.

In the adder 35, the compensation factor for the dark scan noise level from the RAM 38 is subtracted from the output from the data selectors 33. This compensation factor is supplied from the RAM 38 through the shift register 41 and the inverters 42 to the adder 35. The compensation factor for the same light sensor of the array 23 or 25 is controlled by the P/S CLOCK signal supplied to the shift register 41.

The P/S CLOCK signal goes up every time that the ARRAY CLOCK signal changes state so that the P/S CLOCK signal goes up to cause three bits to be supplied from the shift register 41 every time that the five bits are supplied from the data latches 31 through the data selectors 33. Thus, there is the supply of data to the adder 35 from the data latches 31 through the data selectors 33 and from the shift register 41.

The output of the adder 35 is a signal, which has been compensated for the dark scan noise level. The output from the adder 35 is latched in the data latches 46 when the LATCH VIDEO signal goes up. At the same time, the LATCH ROM signal goes up, as shown in FIG. 6, to latch the four bits of data from the shift register 51 in the data latches 52. The LATCH VIDEO and the LATCH ROM signals go up when the P/S CLOCK signal goes down. This insures that there is no shifting of the signals from the shift register 51 to the data latches 52 at the time that the data is latched in the data latches 52 from the shift register 51.

The look-up table of the ROM 53 provides a four bit output in accordance with the inputs from the data latches 52 and the data latches 46. This output signal has been compensated for variations in light conditions because the RAM 48, which supplies its output to the data latches 52, stored the signal produced by the same light sensor during a white scan cycle, and this is the maximum output from the specific light sensor. This signal also is normalized in the ROM 53.

The data from the ROM 53 is latched in the data latches 54 when the LATCH ROM OUT signal goes up. This is when the LATCH VIDEO and the LATCH ROM signals go down, the P/S CLOCK signal goes up, and the ARRAY CLOCK signal changes state as shown in FIG. 6. Thus, when the data latches 54 are latching the output from the ROM 53, the data selectors 33 are supplying the five bits from the other of the two light sensors to the adder 35.

In addition to receiving the four bits from the data latches 54, the adder 56 also receives a signal from the data latches 62. This signal is latched in the data latches 62 from the RAM 57 when the LATCH BLACK signal goes up, and this is when the READ BLACK signal goes down. The LATCH BLACK signal goes up once for every group of eight of the light sensors of the arrays 23 and 25.

Prior to the data being latched in the data latches 62, it was supplied from the RAM 57 by the READ BLACK signal going up. With the BLACK CALIBRATION signal down, the READ BLACK signal goes up at the same time that every eighth of the LATCH ROM OUT signals goes up. This latching of the data in the data latches 62 occurs after the data has been latched in the data latches 54 through the LATCH ROM OUT signal going up. Thus, when the output of the data latches 54 is supplied to the adder 56, the signal from the data latches 54 has the black scan cycle correction subtracted therefrom.

Therefore, the output from the adder 56 has been compensated for the dark scan noise level, the non-uniform gain factor due to variations in light conditions, and the noise level produced by the light sensor from a black document in the presence of illumination. Accordingly, when the LATCH VIDEO OUT signal goes up, the output from the adder 56 is latched in the data latches 64. This is an accurate signal reprsentative of the level of light of the document 15 on the document glass 14 at a specific location.

The scanning of the document 15 continues until the entire length of the document has been scanned. This is accomplished by the housing 11 being moved by the drive mechanism through the cable 16.

When the document 15 has been completely scanned, another of the documents 15 can be placed on the document glass 14. Then, scanning can occur again.

Whenever desired, the dark scan cycle, the white scan cycle, the the black scan cycle can occur. However, with at least one end of the document glass 14 having the white stripe 43 and the black stripe 60, the three cycles usually occur at the end of the scanning of each of the documents 15 although such is not a requisite for satisfactory operation. These cycles may change the corrections for various of the light sensors of the arrays 23-26.

Instead of correcting for variation in light conditions by use of the ROM 53, the ROM 53 could be replaced by a multiplier, which would multiply the signal from the data latches 46 by a correction factor stored in the RAM 48. In such an arrangement, it would be necessary to utilize a divider between the adder 35 and the shift register 45 to obtain the correction signal, which is stored in the RAM 48, during the white scan cycle. In such an arrangement, the correction factor would cause the output from the adder 35 during a white scan cycle for a specific light sensor to be equal to a selected value, which would be the maximum output of any light sensor of the arrays 23 and 25. Thus, the maximum output from a light sensor of one of the arrays 23 and 25 would have the minimum correction factor and the minimum output from a light sensor of one of the arrays 23 and 25 would have the maximum correction factor in order for the correction factor to cause each of the outputs from the adder 35 during a white scan cycle to be equal when multiplied by the correction factor.

Therefore, upon obtaining the correction factor in accordance with the output from the adder 35 during a white scan cycle, this correction factor is supplied to the shift register 45. Thereafter, the correction factor is stored in the RAM 48 in the same manner as the output from the adder 35 is stored in the RAM 48 when using the ROM 53.

While the correction for noise level produced by a light sensor from a black document in the presence of illumination has been made for only one of the light sensors of each group of eight of the light sensors of the arrays 23 and 25, it should be understood that this correction could be made for each of the light sensors. This would necessitate the RAM 57 having ten hundred and twenty-four addressable positions rather than two hundred and fifty-six. It also would necessitate the generation of the READ BLACK and the LATCH BLACK signals for each of the light sensors of the arrays 23 and 25 rather than for each group of eight of the light sensors.

While the present invention has shown and described the normalized level being preferably at least equal to the maximum output of any of the light sensors, it should be understood that such is not a requisite for satisfactory operation. Thus, for example, the normalized level could be less than the maximum output of any of the light sensors but a fixed fraction of the maximum output of any of the light sensors.

An advantage of this invention is that the output from each of a plurality of light sensors arranged in a predetermined relation provides an accurate relation of the light level between the various illuminated areas of a document sensed by the light sensors. Another advantage of this invention is that there is dynamic compensation of the light level in each of the illuminated areas of a document sensed by a different light sensor.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for compensating for noise level variations in individual light sensors arranged in a predetermined relation and for variations in light conditions to which the sensors are subjected including:
    producing a separate output signal from each of the individual light sensors in accordance with the level of light received by each of the individual light sensors;
    correcting each of the separate output signals from each of the individual light sensors for a noise level variation of the same individual light sensor to produce a sensitivity compensated signal for each of the individual light sensors;
    correcting each of the sensitivity compensated signals for variations in light conditions to which each of the individual light sensors is subjected to produce a compensated signal for each of the individual light sensors;
    and changing the compensated signal for each of the individual light sensors in accordance with the variation caused by a black area in the presence of illumination.

2. The method according to claim 1 including:
    storing a correction signal for each of the individual light sensors for variations in light conditions to which the individual light sensor is subjected;
    and utilizing the correction signal for each of the individual light sensors in conjunction with the sensitivity compensated signal for the same individual light sensor to produce the compensated signal for the same individual light sensor.

3. The method according to claim 2 including obtaining each of the correction signals for variations in light conditions by subjecting each of the individual light sensors to a substantially uniform white area.

4. The method according to claim 3 including:
    obtaining the changed signal for each of a selected number of the individual light sensors by subjecting at least one of the selected number of the individual light sensors to the black area in the presence of illumination;
    and determining the magnitude of the changed signal by determining the magnitude of the compensation signal from the one light sensor of the selected number of the individual light sensors.

5. The method according to claim 4 including subtracting the changed signal from the compensated signal for each of the individual light sensors.

6. The method according to claim 5 including producing the separate output signals in serial fashion.

7. The method according to claim 2 including:
    storing a separate compensation signal for each of the individual light sensors in accordance with the noise level variation of the individual light sensor;
    and subtracting the separate compensation signal for each of the individual light sensors from the separate output signal for the same individual sensor prior to making any correction for variations in light conditions.

8. The method according to claim 1 including producing the separate output signals in serial fashion.

9. The method according to claim 8 including:
  storing a separate compensation signal for each of the individual light sensors in accordance with the noise level variation of the individual light sensor;
  and subtracting the separate compensation signal for each of the individual light sensors from the separate output signal for the same individual sensor prior to making any correction for variations in light conditions.

10. An apparatus for compensating for noise level variations in individual light sensors arranged in a predetermined relation and for variations in light conditions to which the sensors are subjected including:
  means to produce a separate output signal from each of the individual light sensors in accordance with the level of light received by each of the individual light sensors;
  first compensating means to correct each of the separate output signals from the individual light sensors for the noise level variation of each of the individual light sensors to produce a sensitivity compensated signal for each of the individual light sensors;
  second compensating means to correct each of the sensitivity compensated signals from said first compensating means for variations in light conditions to which each of the individual light sensors is subjected to produce a compensated signal for each of the individual light sensors;
  and third compensating means to change the compensated signal for each of the individual light sensors from said second compensating means in accordance with variation caused by a black area in the presence of illumination.

11. The apparatus according to claim 10 in which said second compensating means includes:
  means to store a correction signal for each of the individual light sensors for variations in light conditions to which the individual light sensor is subjected;
  and means to utilize the correction signal for each of the individual light sensors in conjunction with the sensitivity compensated signal from said first compensating means for the same individual light sensor to produce the compensated signal for the same individual light sensor.

12. The apparatus according to claim 11 in which said first compensating means includes:
  means to store a separate compensation signal for each of the individual light sensors in accordance with the noise level variation of the individual light sensor;
  and means to subtract the compensation signal for each of the individual light sensors from the separate output signal for the same individual light sensor to produce the sensitivity compensated signal for the same individual light sensor.

13. The apparatus according to claim 12 in which said third compensating means includes:
  means to store a black level calibration signal for a selected number of individual light sensors in accordance with the variation of at least one individual light sensor of the selected number of the individual light sensors caused by a black area in the presence of illumination;
  and means to subtract the black level calibration signal for the selected number of the individual light sensors from the compensated signal produced by said second compensating means for each of the individual light sensors of the selected number of the individual light sensors.

14. The apparatus according to claim 10 in which said first compensating means includes:
  means to store a separate compensation signal for each of the individual light sensors in accordance with the noise level variation of the individual light sensor;
  and means to subtract the compensation signal for each of the individual light sensors from the separate output signal for the same individual light sensor to produce the sensitivity compensated signal for the same individual light sensor.

15. The apparatus according to claim 10 in which said third compensating means includes:
  means to store a black level calibration signal for a selected number of individual light sensors in accordance with the variation of at least one of the individual light sensors of the selected number of the individual light sensors caused by a black area in the presence of illumination;
  and means to subtract the black level calibration signal for the selected number of the individual light sensors from the compensated signal produced by said second compensating means for each of the individual light sensors of the selected number of the individual light sensors.

16. The apparatus according to claim 10 in which the individual light sensors are arranged in at least one array.

17. The apparatus according to claim 10 in which the individual light sensors are arranged in a plurality of arrays.

18. The apparatus according to claim 10 in which said producing means produces the separate output signals in serial fashion.

19. An apparatus for compensating for noise level variations in individual light sensors arranged in a predetermined relation and for variations in light conditions to which the sensors are subjected including:
  means to produce a separate output signal from each of the individual light sensors in accordance with the level of light received by each of the individual light sensors;
  first storage means;
  first connecting means to selectively connect said producing means to said first storage means only when the individual light sensors are not subjected to light to supply a separate output signal from each of the individual light sensors in accordance with the noise level variation of each of the individual light sensors;
  said first storage means storing each of the separate output signals from said producing means for each of the individual light sensors when said first connecting means is effective;
  first subtracting means connected to said producing means to receive all of the separate output signals from said producing means;
  second connecting means to selectively connect said first storage means to said first subtracting means in accordance with the supply of the separate output signals from said producing means except when the individual light sensors are not subjected to light;
  said first subtracting means producing a sensitivity compensated signal for each of the individual light sensors as its output whenever said second connecting means is effective with the sensitivity compensated signal being the difference between the separate output signal from said producing means and the stored signal in said first storage means for the same individual light sensor;

second storage means;

third connecting means to selectively connect said first subtracting means to said second storage means only when the individual light sensors scan a white area in the presence of illumination to supply a separate input signal for each of the individual light sensors to said second storage means in accordance with variations in light conditions to which each of the individual light sensors is subjected;

said second storage means storing each of the separate input signals from said first subtracting means for each of the individual light sensors when said third connecting means is effective;

receiving means to receive the sensitivity compensated signals from said first subtracting means;

fourth connecting means to selectively connect said second storage means to said receiving means in accordance with the supply of the sensitivity compensated signals from said first subtracting means except when the individual light sensors scan a white area in the presence of illumination;

said receiving means including means to correct each of the sensitivity compensated signals from said first subtracting means in accordance with the stored signal in said second storage means for the same individual light sensor to produce a compensated signal for each of the individual light sensors;

third storage means;

fifth connecting means to selectively connect said receiving means to said third storage means when each of the individual light sensors scans a black area in the presence of illumination;

said third storage means storing at least one of each group of a selected number of the compensated signals from said receiving means when said fifth connecting means is effective;

second subtracting means to receive the compensated signals from said receiving means;

sixth connecting means to selectively connect said third storage means to said second subtracting means in accordance with the supply of compensated signals from said receiving means except when the individual light sensors scan a black area in the presence of illumination;

and said second subtracting means producing an output signal for each of the individual light sensors whenever said sixth connecting means is effective with the output signal being the difference between the compensated signal from said receiving means and the stored signal in said third storage means for the same individual light sensor.

20. The apparatus according to claim 19 in which said receiving means includes means to normalize each of the sensitivity compensated signals in addition to compensation for variations in light conditions to which each of the individual light sensors is subjected.

21. The apparatus according to claim 20 in which each of said first storage means, said second storage means, and said third storage means is a random access memory.

22. The apparatus according to claim 19 in which each of said first storage means, said second storage means, and said third storage means is a random access memory.

* * * * *